US012443258B2

(12) United States Patent
Rapaka et al.

(10) Patent No.: US 12,443,258 B2
(45) Date of Patent: *Oct. 14, 2025

(54) ACTIVITY SMOOTHENER CIRCUIT CONTROLLING RATES OF CHANGE OF LOCALIZED PROCESSING ACTIVITY IN AN INTEGRATED CIRCUIT (IC), AND RELATED METHODS

(71) Applicant: Microsoft Technology Licensing, LLC, Redmond, WA (US)

(72) Inventors: Smitha L. Rapaka, San Jose, CA (US); Derek E. Gladding, Poughquag, NY (US); Xiaoling Xu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,064

(22) Filed: Mar. 20, 2024

(65) Prior Publication Data

US 2024/0310891 A1    Sep. 19, 2024

Related U.S. Application Data

(63) Continuation of application No. 17/182,982, filed on Feb. 23, 2021, now Pat. No. 11,960,338.

(51) Int. Cl.
*G06F 1/28*    (2006.01)
*G06F 1/30*    (2006.01)
(Continued)

(52) U.S. Cl.
CPC ............... *G06F 1/28* (2013.01); *G06F 1/305* (2013.01); *G06F 9/4893* (2013.01); *G06F 1/329* (2013.01); *Y02D 10/00* (2018.01)

(58) Field of Classification Search
CPC .......... G06F 1/28; G06F 1/305; G06F 6/4893; G06F 9/4893
See application file for complete search history.

(56) References Cited

U.S. PATENT DOCUMENTS 6,304,978 B1 * 10/2001 Horigan ............... G06F 1/26
713/340
6,636,976 B1 * 10/2003 Grochowski ......... G06F 1/3237
713/320

(Continued)

OTHER PUBLICATIONS

Office Action Received for Taiwan Application No. 111102615, mailed on Aug. 22, 2025, 19 Pages. (English Translation Provided).

*Primary Examiner* — Jaweed A Abbaszadeh
*Assistant Examiner* — Cheri L Harrington
(74) *Attorney, Agent, or Firm* — Alleman Hall & Tuttle LLP

(57) ABSTRACT

An activity smoothener circuit is provided to control rates of change in processing activity to limit di/dt in activity areas of an IC to mitigate voltage droops or overshoots. Controlling the rate of change of activity prevents or reduces instances of a di/dt exceeding a programmed maximum that is based on physical limits of the IC and/or a package. In examples, the activity smoothener circuit includes a hierarchy of smoothening circuits controlling activity in areas down to individual circuit blocks (tiles) including execution circuits. An indication of a desired level of activity is provided to a parent smoothening circuit and the parent smoothening circuit responds with indications of actual activity allowed to occur. At each level of hierarchy, the activity smoothener circuit may use algorithms to generate indications of actual activity based on indications of desired activity and di/dt limits. Di/dt limits and current minimums and maximums are controlled.

16 Claims, 7 Drawing Sheets

(51) Int. Cl.
    *G06F 1/32*      (2019.01)
    *G06F 9/48*      (2006.01)
    *G06F 1/329*     (2019.01)

(56) References Cited

U.S. PATENT DOCUMENTS

| | | | |
|---|---|---|---|
| 7,861,102 B1* | 12/2010 | Ranganathan | G06F 1/3206 |
| | | | 713/340 |
| 2012/0054519 A1* | 3/2012 | Branover | G06F 1/3203 |
| | | | 713/320 |
| 2013/0318371 A1* | 11/2013 | Hormuth | G06F 11/3062 |
| | | | 713/320 |
| 2014/0149760 A1* | 5/2014 | Drake | G06F 9/5094 |
| | | | 713/320 |
| 2016/0091939 A1* | 3/2016 | Severson | G06F 1/26 |
| | | | 713/300 |
| 2016/0187906 A1* | 6/2016 | Bodas | G05F 1/66 |
| | | | 700/287 |
| 2016/0282930 A1* | 9/2016 | Ramachandran | G06F 1/3228 |
| 2017/0031431 A1* | 2/2017 | Khatri | G06F 1/3246 |
| 2017/0364140 A1* | 12/2017 | Banerjee | G06F 1/3206 |
| 2018/0011526 A1* | 1/2018 | Jang | G06F 1/3243 |
| 2019/0146566 A1* | 5/2019 | Pineda de Gyvez | |
| | | | G06F 11/3447 |
| | | | 713/322 |
| 2020/0249974 A1* | 8/2020 | Sutton | G06F 1/3287 |
| 2022/0100247 A1* | 3/2022 | Garg | G06F 1/324 |

* cited by examiner

ACTIVITY SMOOTHENER CIRCUIT CONTROLLING RATES OF CHANGE OF LOCALIZED PROCESSING ACTIVITY IN AN INTEGRATED CIRCUIT (IC), AND RELATED METHODS

RELATED APPLICATION

The present application is a continuation of and claims priority to U.S. patent application Ser. No. 17/182,982, filed on Feb. 23, 2021, entitled "ACTIVITY SMOOTHENER CIRCUIT CONTROLLING RATES OF CHANGE OF LOCALIZED PROCESSING ACTIVITY IN AN INTEGRATED CIRCUIT (IC), AND RELATED METHODS," which is hereby incorporated herein by reference in its entirety.

FIELD OF THE DISCLOSURE

The technology of the disclosure relates to managing stability of power supply voltage in an integrated circuit, such as a system-on-a-chip (SoC), including a distribution of processing and/or accelerator circuits.

BACKGROUND

Electronic devices with powerful and diverse functionality are made possible by integrated circuit (IC) chips that include large numbers of circuits for data processing. The circuitry within IC chips can include many execution units for performing tasks that support device operation and user applications. Execution units can be general purpose processing circuits and specialized accelerator circuits, and each execution unit performs a particular set of tasks. Execution units are disposed in circuit blocks around the area of an IC chip with a power distribution network providing a supply voltage to all the circuit blocks. When processing activity is triggered in a number of execution units in a short period of time, the amount of current drawn from the power supply suddenly increases. A large current surge within one or more circuit blocks in a local area powered by the same part of the power distribution network can cause a localized voltage droop ("IR droop") due to impedance and resistance in the power distribution network, especially in the absence of sufficient capacitance. If the power supply voltage droops below the circuit operating voltage, the circuit behavior is unpredictable and may result in control and data signal errors.

Existing methods for addressing voltage droops include improved detection and quick adjustments to supply voltage and/or system clock frequency. Increased sensitivity to voltage changes can improve response time for reacting to a detected voltage droop. An example of a voltage adjustment response may be a signal to a power supply to increase a voltage level in the part of the power distribution network experiencing the voltage droop before the supply voltage goes below a threshold low level. A frequency adjustment response can be a signal requesting to skip a clock cycle or reduce a system clock frequency. Current surges occur in response to a system clock transition, so reducing the system clock frequency reduces a rate of power consumption (i.e., current demand) in a circuit block that is triggered by the system clock. However, problems with these approaches include failing to react quickly enough to avoid errors, negatively impacting performance of the IC, and overcompensating the voltage response, which can cause circuit damage. Another approach is to include additional capacitance in the power distribution network to mitigate sudden voltage variations but additional capacitors occupy area of an IC chip, which causes the IC chip to be larger and more expensive.

SUMMARY

Exemplary aspects disclosed herein include an activity smoothener circuit controlling rates of change of processing activity in an integrated circuit (IC). Methods of managing rates of change of processing activity in an IC are also disclosed. High levels of power are consumed by the activity (e.g., processing activity) of execution circuits (processing elements or accelerators) distributed across an IC, such as a system-on-chip (SOC). An increase in activity is directly associated with an increase in current drawn by the execution circuits and a sudden change in activity can cause a sudden localized change in current (di/dt) to occur in a power distribution network in the IC. A large di/dt can cause variations in a power supply voltage, such as brownouts, in which the supply voltage drops below a circuit operating voltage and create processing errors, or voltage surges that can damage circuits. Hence, controlling the activity level of the IC can prevent rapid changes in current that would cause voltage variations with minimal impact to IC performance.

In exemplary aspects, an activity smoothener circuit is provided to control rates of change in processing activity to limit di/dt in activity areas of an IC to avoid or mitigate voltage droops. Controlling the rate of change of activity prevents or reduces instances of a di/dt exceeding a programmed maximum for the physical limits of the IC and/or a package. In one example, the activity smoothener circuit includes a hierarchy of smoothening circuits for managing activity across an entire IC with a hierarchy of controlled activity areas decreasing in size down to individual circuit blocks (tiles). In one example, an indication of a desired level of activity is provided to a parent smoothening circuit by a plurality of child smoothening circuits and the parent smoothening circuits responds with indications of actual activity allowed to occur in each child smoothen circuit. At each level of hierarchy, the activity smoothener circuit may use algorithms to generate indications of actual activity based on desired activity indications and programmed di/dt limits. As an example, di/dt increase and decrease, as well as a current minimum ("floor") and current maximum ("ceiling") may be controlled. In one example, a rate of increase in activity may be limited. Conversely, "credits" may be provided to maintain or raise a level of activity (e.g., by performing fake work) in execution circuits to prevent a sudden activity decrease or a total activity decrease that would allow current draw to drop below a floor level.

In an exemplary aspect, an activity smoothener circuit in an integrated circuit (IC) is disclosed. The activity smoothener circuit comprises a plurality of circuit blocks (tiles) each comprising an execution circuit, and each of the plurality of tiles is configured to generate an indication of desired activity of the tile, receive an indication of actual activity for the tile, and control task execution activity in the execution circuit of the tile according to the indication of actual activity for the tile. The activity smoothener circuit also comprises a smoothening circuit for a cluster including a plurality of tiles. The smoothening circuit is configured to receive the indications of desired activity from each of the plurality of tiles and generate an indication of desired activity in the cluster based on the plurality of indications of desired activity in the tiles. The smoothening circuit is further configured to receive an indication of actual activity for the cluster based on the indication of desired activity for the cluster and generate the indications of actual activity for each of the plurality of tiles based on the indications of desired activity in the tiles, the indication of actual activity in the cluster, and a limit of a rate of change of current in IC.

In another exemplary aspect, an IC comprising an activity smoothener circuit is disclosed. The activity smoothener circuit comprises a plurality of cluster smoothening circuits. Each of the plurality of cluster smoothening circuits is configured to receive indications of desired activity for each of a plurality of circuit blocks (tiles), generate an indication of desired activity for the plurality of tiles based on the plurality of indications of desired activity, receive an indication of actual activity for the plurality of tiles, and generate an indication of actual activity for each of the plurality of tiles based on the indications of desired activity for each of the plurality of tiles, the indication of actual activity for the plurality of tiles, and a limit of a rate of change of current. The activity smoothener circuit further comprises a node smoothening circuit configured to receive from each of the plurality of cluster smoothening circuits, the indication of desired activity for the plurality of tiles and generate an indication of desired activity for the plurality of cluster smoothening circuits based on the indications of desired activity received from each of the plurality of cluster smoothening circuits. The node smoothening circuit is also configured to receive an indication of actual activity for the plurality of cluster smoothening circuits and, for each of the plurality of cluster smoothening circuits, generate the indication of actual activity for the plurality of tiles based on the indications of desired activity for the plurality of tiles received from each of the plurality of cluster smoothening circuits, the indication of actual activity for the plurality of cluster smoothening circuits, and a limit of a rate of change of current.

An exemplary method of smoothening activity in an integrated circuit (IC) is also disclosed. The method comprises, in each of a plurality of circuit blocks (tiles), generating an indication of desired activity indicating that an execution circuit in the tile has a task to execute. The method comprises, receiving, in a smoothening circuit, the indications of desired activity from each of the plurality of tiles and generating, in the smoothening circuit, an indication of actual activity for each of the plurality of tiles based on the indications of desired activity from each of the plurality of tiles and on a limit of a rate of change of current. The method comprises in each of the plurality of tiles, in response to receiving the indication of actual activity, executing the task according to the indication of actual activity.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
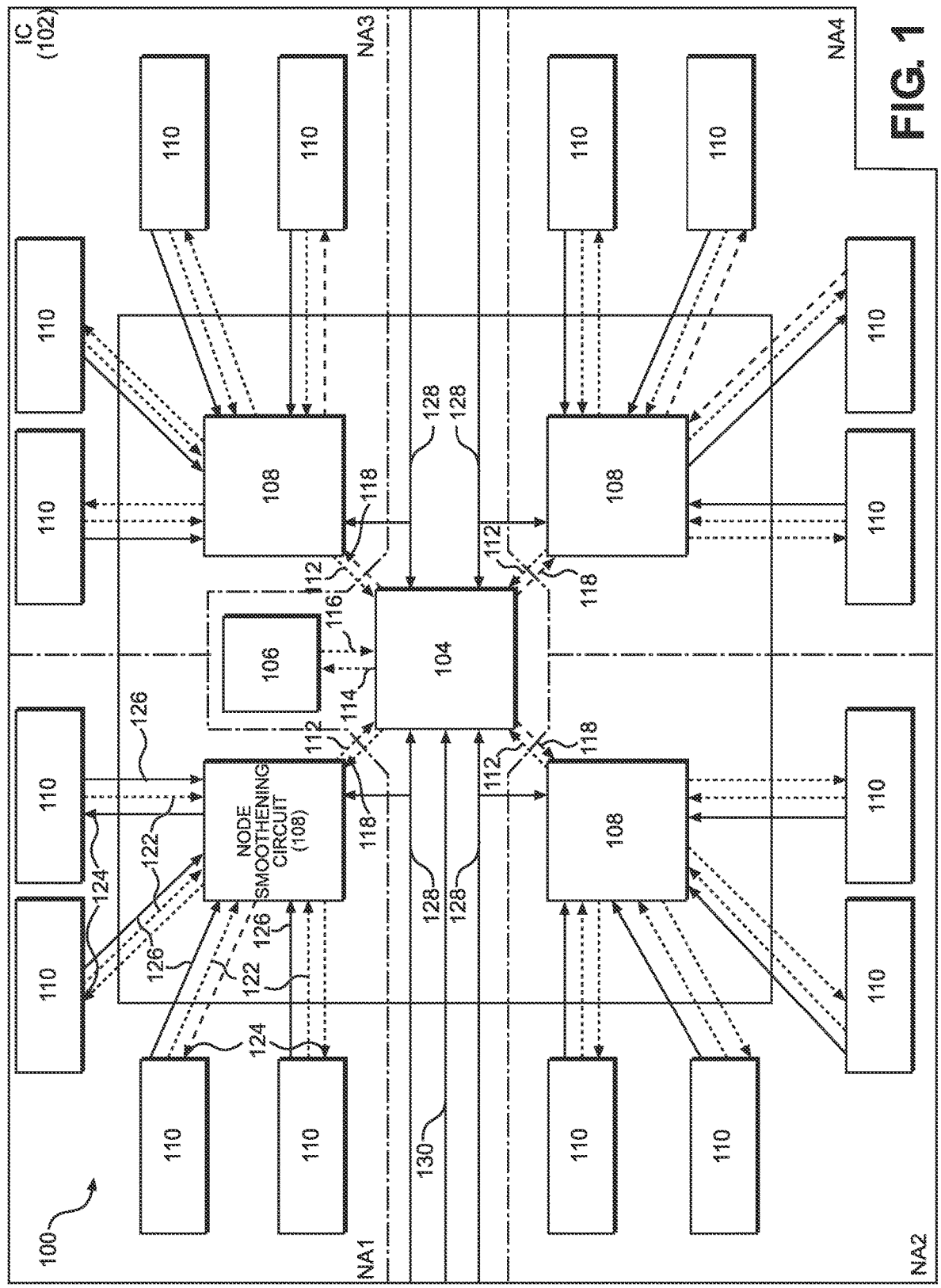
FIG. 1 is a block diagram of an activity smoothener circuit including hierarchical smoothening circuits configured to avoid voltage variations in areas of an IC (not shown) by controlling actual localized activity based on indications of desired activity.
Figure 6:
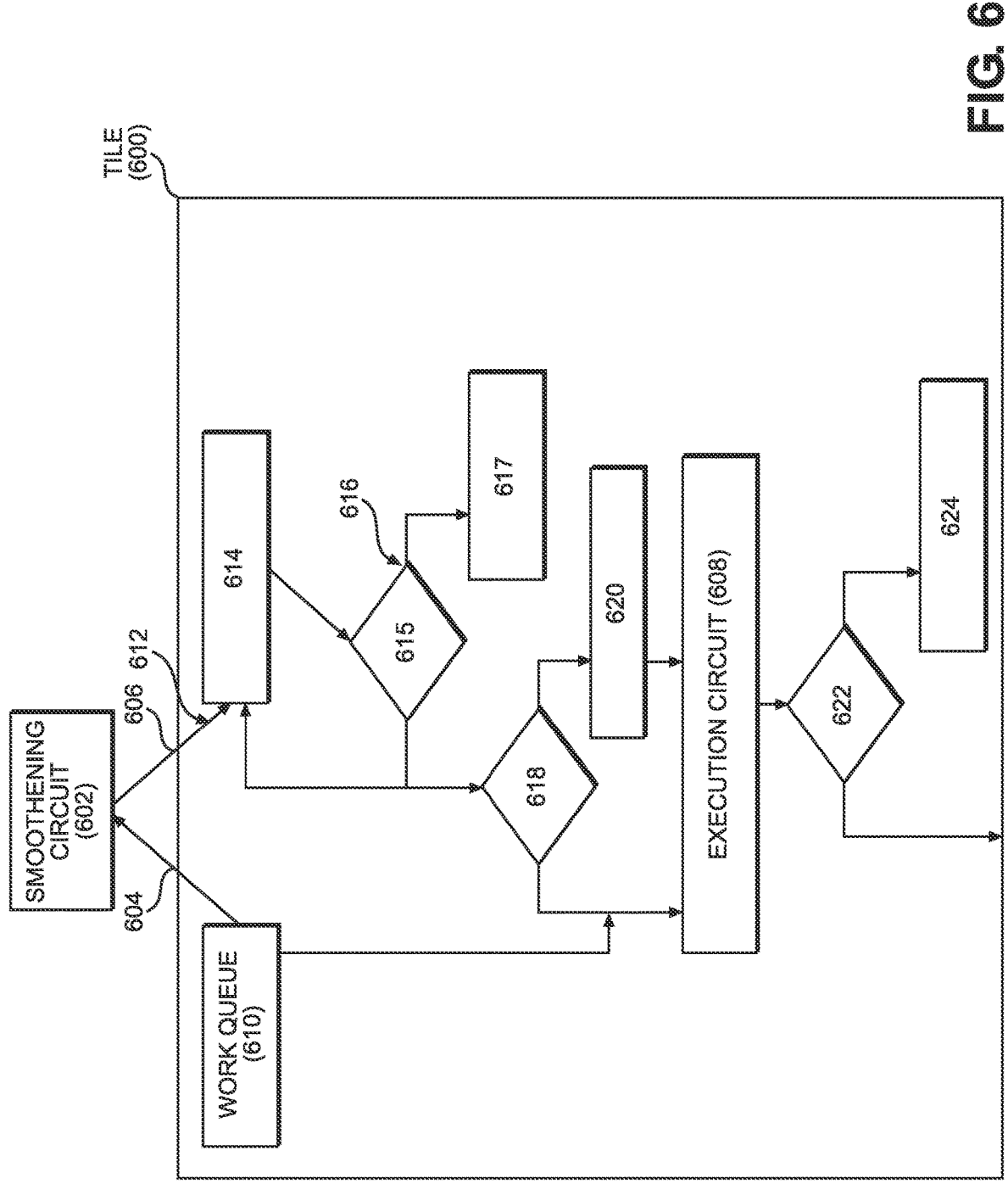
Figure 7:
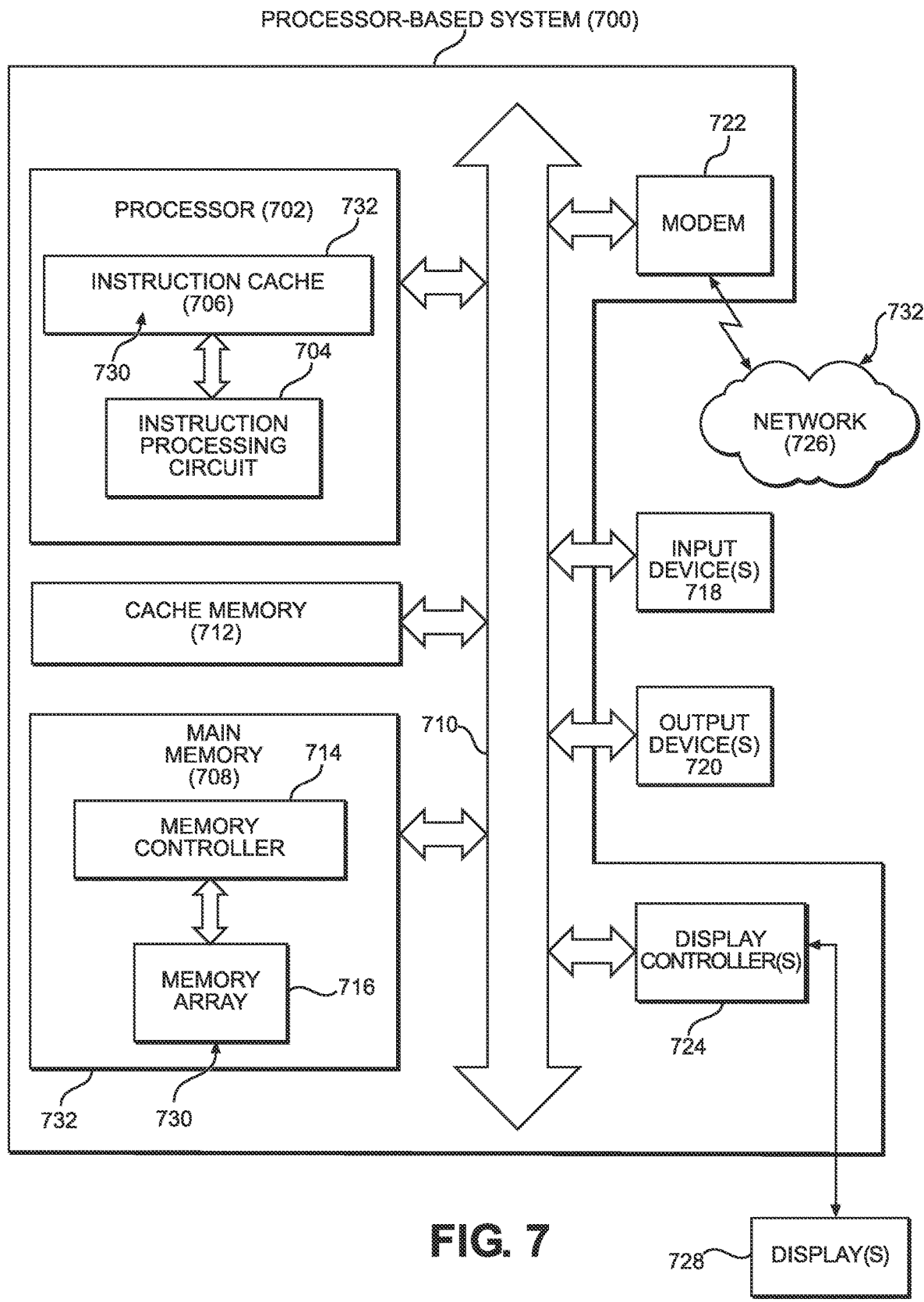

FIG. 6 is a block diagram illustrating operation of a tile including an execution circuit in response to being assigned a task for execution and receiving an indication of actual activity from a parent smoothening circuit; and FIG. 7 is a block diagram of an exemplary processor-based system including a plurality of devices coupled to a system bus, wherein any component within the processor-based system may employ an activity smoothener circuit, to hierarchically control activity in areas of an IC to avoid or mitigate voltage variations, as illustrated in FIG. 1.

DETAILED DESCRIPTION

Exemplary aspects disclosed herein include an activity smoothener circuit controlling rates of change of processing activity in an integrated circuit (IC). Methods of managing rates of change of processing activity in an IC are also disclosed. High levels of power are consumed by the activity (e.g., processing activity) of execution circuits (processing elements or accelerators) distributed across an IC, such as a system-on-chip (SOC). An increase in activity is directly associated with an increase in current drawn by the execution circuits and a sudden change in activity can cause a sudden localized change in current (di/dt) to occur in a power distribution network in the IC. A large di/dt can cause variations in a power supply voltage, such as brownouts, in which the supply voltage drops below a circuit operating voltage and create processing errors, or voltage surges that can damage circuits. Hence, controlling the activity level of the IC can prevent rapid changes in current that would cause voltage variations with minimal impact to IC performance.

In exemplary aspects, an activity smoothener circuit is provided to control rates of change in processing activity to limit di/dt in activity areas of an IC to avoid or mitigate voltage droops. Controlling the rate of change of activity prevents or reduces instances of a di/dt exceeding a programmed maximum for the physical limits of the IC and/or a package. In one example, the activity smoothener circuit includes a hierarchy of smoothening circuits for managing activity across an entire IC with a hierarchy of controlled activity areas decreasing in size down to individual circuit blocks (tiles). In one example, an indication of a desired level of activity is provided to a parent smoothening circuit by a plurality of child smoothening circuits and the parent smoothening circuits responds with indications of actual activity allowed to occur in each child smoothen circuit. At each level of hierarchy, the activity smoothener circuit may use algorithms to generate indications of actual activity based on desired activity indications and programmed di/dt limits. As an example, di/dt increase and decrease, as well as a current minimum ("floor") and current maximum ("ceiling") may be controlled. In one example, a rate of increase in activity may be limited. Conversely, "credits" may be provided to maintain or raise a level of activity (e.g., by performing fake work) in execution circuits to prevent a sudden activity decrease or a total activity decrease that would allow current draw to drop below a floor level.

FIG. 1 is a block diagram of an activity smoothener circuit 100 for hierarchically controlling activity in an IC 102, in response to desired activity in activity areas to avoid or mitigate voltage variations. The hierarchy of the activity smoothener circuit 100 includes a top smoothening circuit 104 coupled to a system activity circuit 106 that may be internal or external to the IC 102. The top smoothening circuit 104, in conjunction with the system activity circuit 106, provides a highest level of control of activity in the IC 102, which may be the entire area of the IC 102. In another example, the system activity circuit 106 may be a parent smoothening circuit to the top smoothening circuit 104 and external to the IC 102 in a larger hierarchy including a plurality of ICs 102.

The top smoothening circuit 104 is coupled to a plurality of node smoothening circuits 108 that control activity across node areas NA1-NA4 of IC 102. In turn, the node smoothening circuits 108 are each coupled to a plurality of cluster smoothening circuits 110. In the example in FIG. 1, the activity smoothener circuit 100 includes four (4) node smoothening circuits 108 that are each coupled to four (4) cluster smoothening circuits 110 but, in other examples, there may be more or fewer node smoothening circuits 108 in the IC 102 and more or fewer cluster smoothening circuits 110 associated with each node smoothening circuit 108.

The top smoothening circuit 104 receives indications 112 of desired activity from each of the node smoothening circuits 108. As explained in detail below, the indications 112 of desired activity may be summed or otherwise combined to generate an indication 114 of desired activity for the combined activity areas NA1-NA4 controlled by the activity smoothener circuit 100. The indication 114 is forwarded to the system activity circuit 106. In examples in which the system activity circuit 106 is another level in a hierarchy, the system activity circuit 106 would receive a plurality of indications 114 of desired activity. In the example in FIG. 1, the system activity circuit 106 and the top smoothening circuit 104 form the highest level of hierarchy in the activity smoothener circuit 100 and the system activity circuit 106 generates an indication 116 of actual activity that is provided to the top smoothening circuit 104 based on the indication 114 of desired activity. As an example, the indication 116 of actual activity may simply be the indication 114 of desired activity fed directly back to the top smoothening circuit 104. Alternatively, the system activity circuit may be programmed or controlled to generate the indication 116 of actual activity based on the indication 114 of desired activity. In the case in which the system activity circuit 106 is coupled to another level in a hierarchy, the system activity circuit 106 may provide the indication 114 of desired activity to a parent smoothening circuit (not shown) and receive the indication 116 of actual activity from the parent smoothening circuit. Herein, parent smoothening circuit and child smoothening circuit refer to a relationship of one smoothening circuit to another smoothening circuit at a higher or lower level of hierarchy. A parent smoothening circuit receives indications (e.g., 112, 114, 122) of desired activity from a child smoothening circuit and a child smoothening circuit receives indications (e.g., 116, 118, 124) of actual activity from a parent smoothening circuit.

The top smoothening circuit 104 receives the indication 116 of actual activity and generates indications 118 of actual activity to each of the node smoothening circuits 108. In some cases, the indications 118 of actual activity may equally distribute actual activity among the node smoothening circuits 108. In such case, the top smoothening circuit 104 determines the indications 118 of actual activity by dividing the indication 116 of actual activity among the number of node smoothening circuits 108 in the activity smoothener circuit 100. In some cases, the top smoothening circuit 104 may adjust the indications 118 of actual activity to each of the respective node smoothening circuits 108 based on the indications 112 of desired activity received from the respective node smoothening circuits 108. For example, the indications 118 of actual activity may be weighted according to the respective indications 112 of desired activity. The indications 112 of desired activity may also be adjusted based on programmable features or algorithms applied within the top smoothening circuit 104. Other signals (not shown) may be included for purposes of communication between the top smoothening circuit 104 and the node smoothening circuits 108. In addition, the top smoothening circuit 104 receives signals for programming and/or controlling algorithms that operate within the top smoothening circuit 104.

Also shown in FIG. 1, the node smoothening circuits 108 each receive indications 122 of desired activity from the cluster smoothening circuits 110 and generate indications 124 of actual activity that are provided back to the respective cluster smoothening circuits 110. The node smoothening circuits 108 can throttle and/or adjust the received indications 122 of desired activity and sum the indications 122 of desired activity. The node smoothening circuit 108 generates the indication 112 of desired activity for the plurality of cluster smoothening circuits 110 based on (e.g., a sum of) the indications 122 of desired activity received from each of the plurality of cluster smoothening circuits 110. The node smoothening circuit 108 receives the indications 118 of actual activity for the plurality of cluster smoothening circuits 110 from the top smoothening circuit 104. For each of the plurality of cluster smoothening circuits 110, the node smoothening circuit 108 generates the indication 124 of actual activity for a plurality of tiles coupled to the respective cluster smoothening circuit 110. The indication 124 of actual activity may be based on the indications 122 of desired activity for the plurality of tiles 202 received from each of the plurality of cluster smoothening circuits 110. The node smoothening circuit 108 can also, additionally or alternatively, generate the indication 124 of actual activity for the plurality of tiles based on the indication 118 of actual activity for the plurality of cluster smoothening circuits 110 and on a limit of a rate of change of current (di/dt).

The node smoothening circuit 108 may equally distribute actual activity among the cluster smoothening circuits 110 based on a number of cluster smoothening circuits 110 coupled to the node smoothening circuit 108. In some cases, the node smoothening circuit 108 may adjust the indications 124 of actual activity to each of the respective cluster smoothening circuits 110 based on the indications 122 of desired activity received from the respective cluster smoothening circuits 110. The indications 124 of actual activity may also be adjusted based on programmable features or algorithms applied within the node smoothening circuits 108. The node smoothening circuits 108 also receive a clock signal 126 from each of the cluster smoothening circuits 110 to synchronize communication of the indications 122 of desired activity and the indications 124 of actual activity, as follows.

The top smoothening circuit 104 also receives clock signals 128 provided at frequencies corresponding to the respective node smoothening circuits 108. The clock signals 128 enable synchronized communication between the top smoothening circuit 104 and the respective node smoothening circuits 106, such as communication of the indications 112 of desired activity and the indications 118 of actual activity. The top smoothening circuit 104 also receives a system clock 130 to maintain synchronization with the IC 102.

Figure 2:
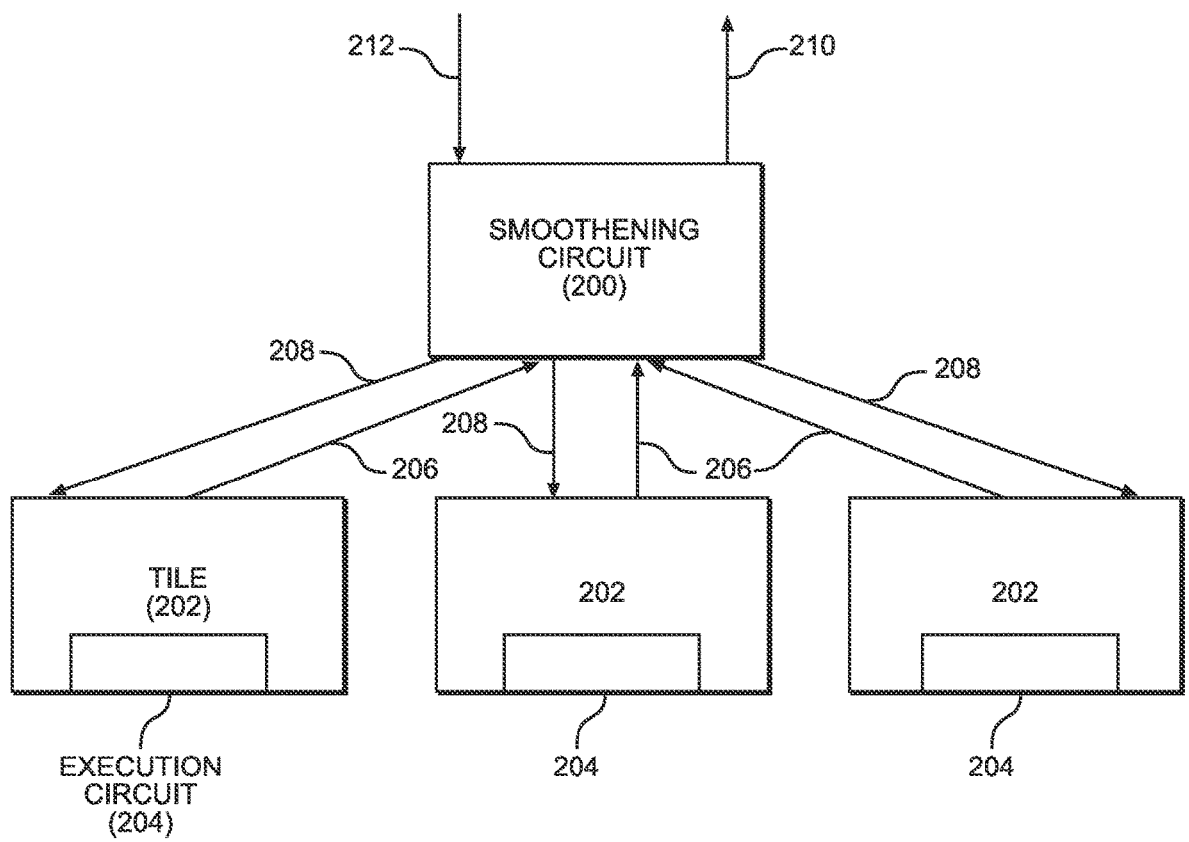
FIG. 2 is a block diagram of a smoothening circuit at the lowest level of hierarchy of the activity smoothener circuit of FIG. 1 coupled to a plurality of tiles to control activity in corresponding execution circuits.

FIG. 2 is a block diagram of a smoothening circuit 200 at the lowest level of hierarchy (e.g., a leaf node) of the activity smoothener circuit 100 in FIG. 1. As an example, the smoothening circuit 200 may be the cluster smoothening circuit 110 of FIG. 1. The smoothening circuit 200 in FIG. 2 is coupled to a plurality of tiles 202. Herein, a tile 202 can refer to a circuit block, which is a group of circuits (not shown) (e.g., transistors, resistors, inductors, and/or capacitors interconnected by wires) within a physical area and/or configured to perform a function or set of functions and includes an execution circuit 204. In this context, an execution circuit 204 is any processing circuit (e.g., general processing unit) or accelerator circuit for performing or configured to perform generalized and/or specialized tasks (e.g., hardware algorithms) in the IC 102. As discussed above, activity in execution circuits 204 draws current from a power distribution system (not shown).

One or more tasks may be assigned to an execution circuit 204. Herein, a task refers to a programming instruction or other mechanism for controlling the execution circuit 204 to execute an operation (e.g., to process data). Based on the assigned tasks or tasks being executed, the indication 122 of desired activity within the tile is generated and sent to the smoothening circuit 200 coupled to the tile 202. A response of the smoothening circuit 200 to indications 206 of desired activity from the tiles 202 includes generating indications 208 of actual activity, which respectively control activity of the execution circuits 204 in the tiles 202. First, the smoothening circuit 200 generates an indication 210 of desired activity to a parent smoothening circuit (not shown) and receives an indication 212 of actual activity from the parent smoothening circuit. In the case of the smoothening circuit 200 being the cluster smoothening circuits 110, the indication 210 of desired activity is the indication 122 of desired activity generated based on the plurality of indications 206 of desired activity in the tiles 202 and the received indication 212 of actual activity is the indication 124 of actual activity from the node circuit 108. The cluster smoothening circuit 200 generates the indications 208 of actual activity for each of the plurality of tiles 202 based on the indications 206 of desired activity from the tiles 202, the indication 212 of actual activity and a limit of a rate of change of current (di/dt limit). A limit of a rate of change of current (di/dt) corresponds to a limit of a rate of change of activity in the tiles 202. The limit of di/dt set in the cluster smoothening circuit 200 may be based on a local limit in the tiles 202, a limit for the IC 102, or an intermediate area limit set at another level of hierarchy. Since the cluster smoothening circuit 110 controls activity in a plurality of tiles 202, the limit of a rate of change of current indicated in the cluster smoothening circuit 100 may differ from the limit of a rate of change of current in the plurality of tiles 202. Similarly, a limit of a rate of change of current in the node smoothening circuit 108 may be different than the limit of a rate of change of current in the plurality of cluster smoothening circuits 110. Avoiding a di/dt limit includes limiting a rate of change of actual activity in the tiles 202. Although only three (3) tiles 202 are coupled to the smoothening circuit 200 in FIG. 2, more or fewer tiles 204 may be coupled to the smoothening circuit 200 in another example. Each of the tiles 202 and the smoothening circuit 200 may receive a shared system clock (not shown). Alternatively, each of the tiles 202 can provide a clock signal (not shown) to the smoothening circuit 200 to synchronize communications due to changes in frequency within each of the tiles 202.

Figure 3:
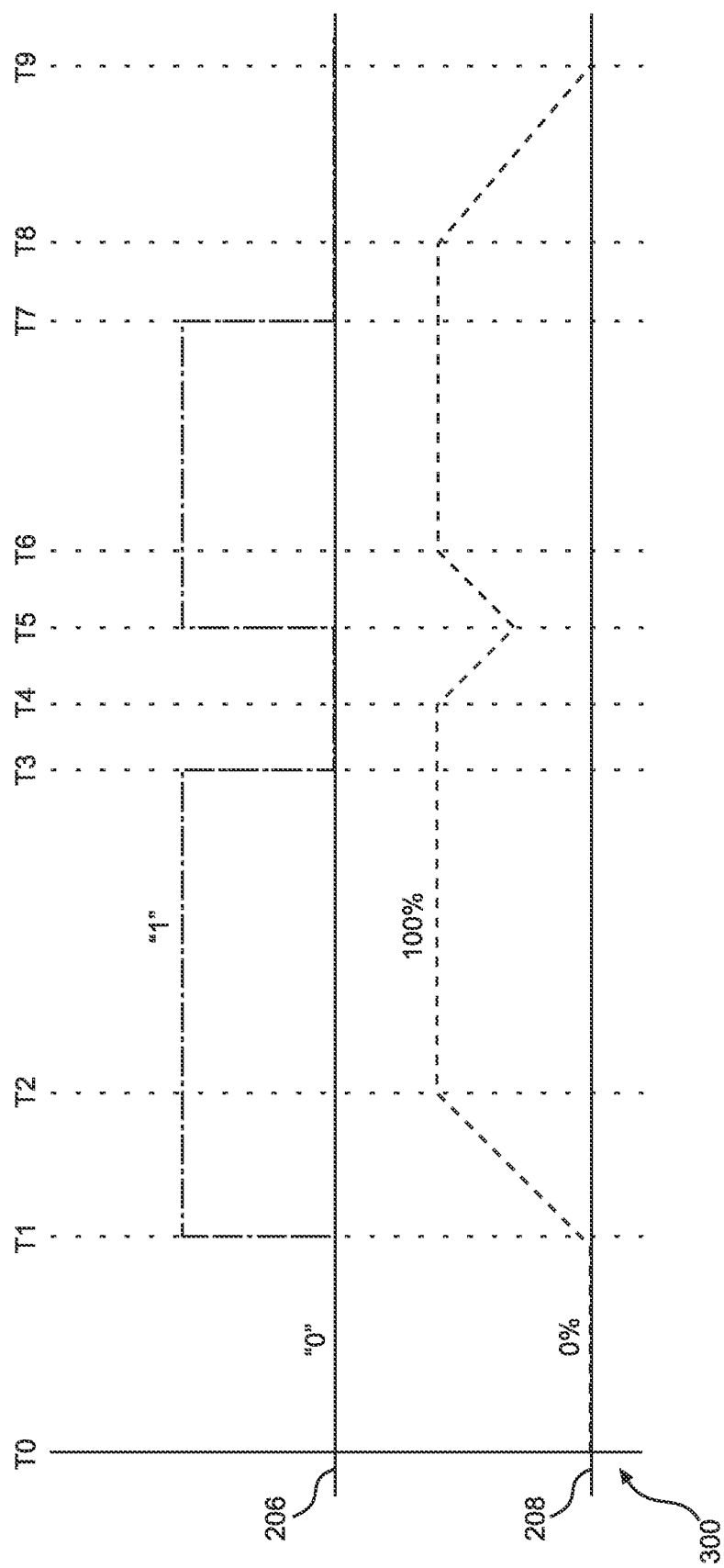
FIG. 3 is a timing diagram illustrating an indication of desired activity by a child smoothening circuit and a corresponding indication of actual activity indicated by a parent smoothening circuit based on a di/dt limit.

FIG. 3 is a timing diagram 300 illustrating an example of the indication 206 of desired activity from one of the tiles 202 to one of the smoothening circuits 200 in FIG. 2 and a corresponding indication 208 of actual activity from the smoothening circuit 200 to the tile 202. In this example, the indication 206 of desired activity is a one-bit binary signal indicating whether the execution circuit 204 in the tile 202 does or does not desire to perform a task. An indication 206 of desired activity may be an indication that the execution circuit 204 has been assigned a task to perform or is currently executing a task.

In the timing diagram 300, the indication 206 of desired activity begins at a binary "0" and remains there from time T0 to time T1 indicating that the tile 202 is does not desire to perform any activity (i.e., does not have any tasks to execute). At time T1, the indication 206 of desired activity switches from a binary "0" to a binary "1" indicating the tile 202 has one or more tasks to perform. In response to the indication 206 of desired activity, the indication 208 of actual activity is generated (e.g., by the smoothening circuit 200). The indication 208 of actual activity includes values in a range indicating levels of actual activity allowed in the tile 202. In this example, the indication 208 of actual activity gradually ramps up, indicating continuous values from a value of 0% at time T1 to a value of 100% at time T2, where a value of 0% indicates that no actual activity should occur in the tile 202 (i.e., no activity level) and a value of 100% indicates a 100% (e.g., maximum) activity level of the tile 202, which corresponds to the execution circuit 204 executing tasks at a maximum rate. The indication 208 of actual activity is gradually ramped up so activity level will gradually increase and the current drawn by the tile 202 will also gradually increase such that the rate of current increase (di/dt) will be less than a maximum allowable di/dt in the tile 202.

An indication 208 of actual activity at 50% of the maximum allows the execution circuit 204 to have an activity level that is 50% of its maximum operating capability. A rate of operation of 50% may be achieved in various ways, such as by performing activity in every other cycle, for example, and a rate of 25% may be achieved by performing activity in every fourth cycle. In such example, a clock signal in the tile 202 may be gated or blocked to prevent activity in some cycles to achieve the actual activity level indicated by the indication 208 of actual activity. Other methods of moderating activity in the tile 202 are also available.

Returning to the timing diagram 300, the indication 206 of desired activity remains at binary "1" from time T1 to time T3, at which time the indication 206 of desired activity returns to binary "0". The indication 206 of desired activity dropping to binary "0" may indicate, for example, that there are no new pending tasks for the execution circuit 204 or that all tasks are complete. In response to the indication 206 of desired activity returning to binary "0", the indication 208 of actual activity begins to ramp down (decrease gradually) at time T4. Ramping down the actual activity of the tile 202 causes the current drawn by the execution circuit 204 to gradually decrease, such that the di/dt will be below a programmable or predetermined limit for a rate of current decrease. At time T5, the indication 206 of desired activity switches to a binary "1", indicating a new task assigned to the execution circuit 204. In response, the indication 208 of actual activity stops ramping down and begins ramping up to allow a di/dt that is below a programmable or predetermined limit for a rate of current increase in the tile 202, the IC 102, or an area of the IC 102 controlled by an intermediate level of hierarchy.

Continuing with FIG. 3, at time T6 the indication 208 of actual activity reaches 100%, at which it remains until time T7. At time T7 the indication 206 of desired activity returns to binary "0" and, in response, the indication 208 of actual activity begins to ramp down at time T8 and reaches 0% at time T9, after which the tile 202 is idle (e.g., no longer has a task to be executed). The rates or slope of ramping up and ramping down of the indication 208 of actual activity in FIG. 3 are illustrative only and may vary according to operation of the smoothening circuit 200 and other levels of hierarchy in the activity smoothener circuit 100 in FIG. 1.

Figure 4:
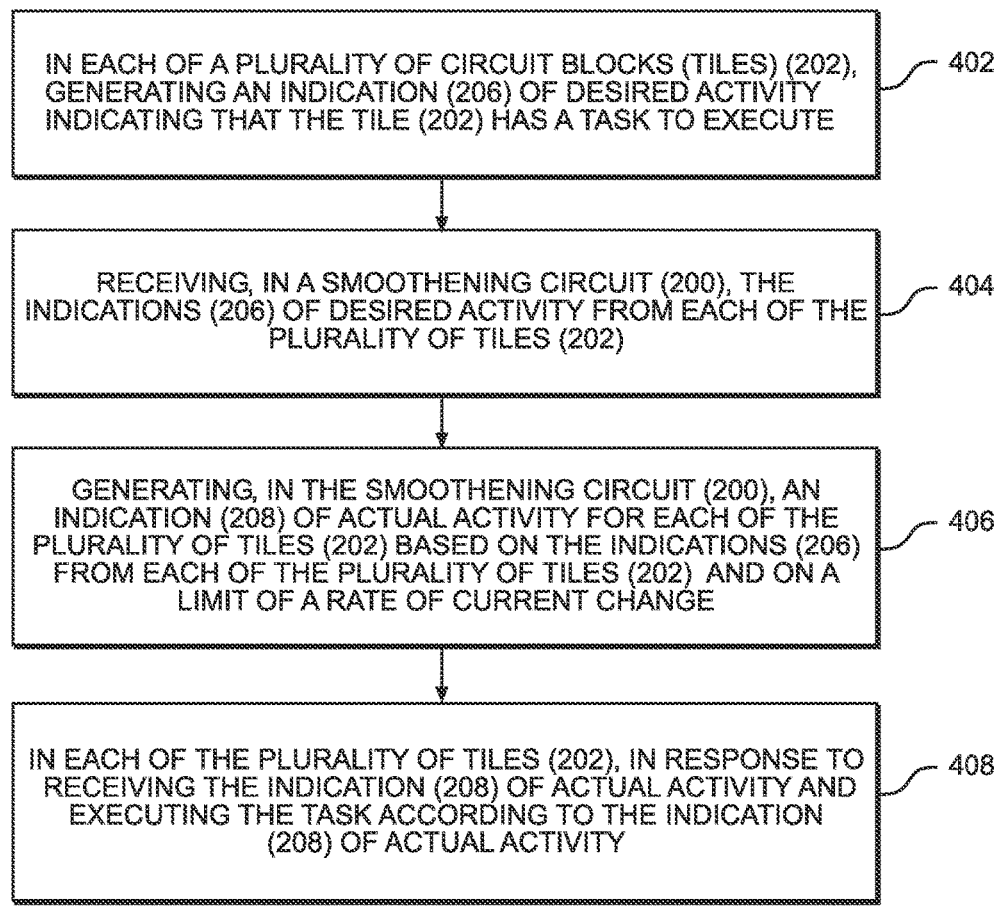
FIG. 4 is a flowchart illustrating a method of controlling a rate of change of activity in a tile based on a di/dt limit and an indication of a desired activity.

FIG. 4 is a flowchart illustrating a method 400 of smoothening activity in an IC. The method 400 includes, in each of a plurality of circuit blocks (tiles) 202, generating an indication 206 of desired activity indicating that the tile 202 has a task to execute (block 402). The method 400 includes receiving, in a smoothening circuit 200, the indications 206 of desired activity from each of the plurality of tiles 202 (block 404). The method 400 further includes generating, in the smoothening circuit 200, an indication 208 of actual activity for each of the plurality of tiles 202 based on the indications 206 of desired activity from each of the plurality of tiles 202 and on a limit of a rate of change of current (block 406). The method 400 also includes, in each of the plurality of tiles 202, in response to receiving the indication 208 of actual activity, executing the task according to the indication 208 of actual activity (block 408).

Figure 5:
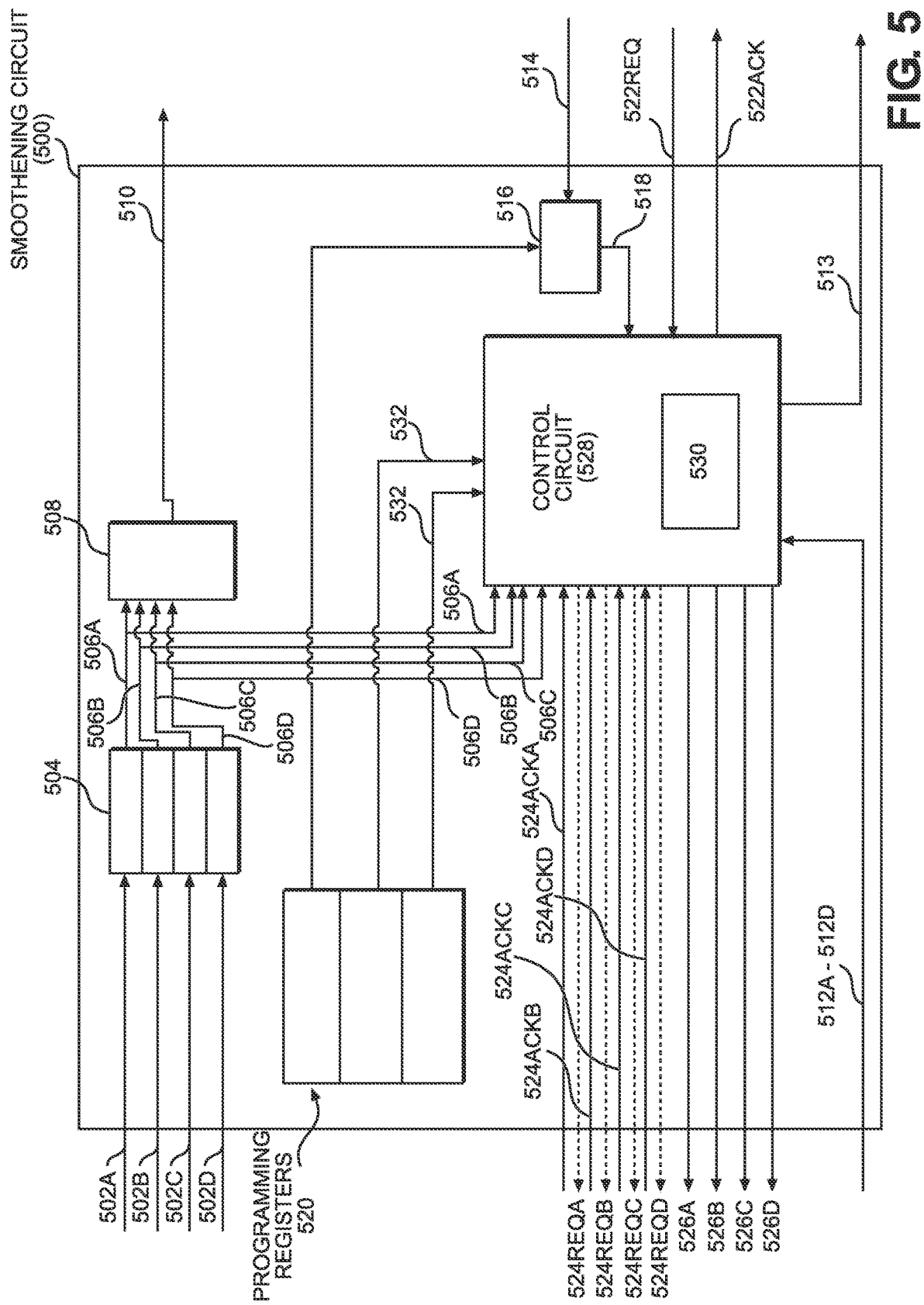
FIG. 5 is a schematic block diagram of a smoothening circuit in the activity smoothener circuit in FIG. 1 including programming and logic circuits for adjusting indications of desired activity and indications of actual activity.

FIG. 5 is a schematic block diagram of a smoothening circuit 500 in the activity smoothener circuit 100 in FIG. 1. The smoothening circuit 500 could be any of the top smoothening circuit 104, the node smoothening circuit 108, or the cluster smoothening circuit 110 in FIG. 1 or the smoothening circuit 200 in FIG. 2. The smoothening circuit 500 receives indications 502A-502D of desired activity from a plurality of child smoothening circuits (not shown) of the smoothening circuit 500. For example, the node smoothening circuits 108 in FIG. 1 are child smoothening circuits of the top smoothening circuit 104 and the cluster smoothening circuits 110 are child smoothening circuits of the node smoothening circuits 108. Additionally, the tiles 202 in FIG. 2 are child smoothening circuits of the cluster smoothening circuits 110. Internal features and operation of the smoothening circuit 500 are presented in detail with reference to FIG. 5.

In FIG. 5, the smoothening circuit 500 receives the four (4) indications 502A-502D of desired activity from child smoothening circuits. The indications 502A-502D may be any of the indications 112, 122, and 206 of desired activity in FIGS. 1 and 2. The indications 206 in FIG. 2 are single bit binary signals having only values of binary "0" and binary "1" indicated by a ground voltage or a supply voltage, respectively, but the indications 502A-502D may take other forms. For example, the indications 502A-502D may be analog signals in which continuous or incremental voltage levels from zero volts to a maximum of the supply voltage provide the indications 502A-502D of desired activity in a range from zero to a maximum value. The maximum values may depend on the number of indications 502A-502D of desired activity. The indications 502A-502D of desired activity may also be digital signals providing the indications 502A-502D in the form of binary values of one or more bits (e.g., 8 bits). The smoothening circuit 500 includes configurable desired activity circuits 504 that can be configured to throttle and/or otherwise adjust the indications 502A-502D to create adjusted desired activity indications 506A-506D. Throttling may refer to reducing a magnitude or a rate of change of the indications 502A-502D. Other adjustments can also be made by the configurable desired activity circuits 504, such as extending a time of the indications 502A-502D of desired activity (e.g., to compensate for throttling) or normalizing the indications 502A-502D.

The adjusted desired activity indications 506A-506D are combined in summing circuit 508 to generate an indication 510 of desired activity that is provided to a parent smoothening circuit (not shown). The indication 510 of desired activity may be an analog or digital value like the indications 502A-502D. The smoothening circuit 500 may receive clock signals 512A-512D from the child smoothening circuits and provide a clock signal 513 to the parent smoothening circuit to synchronize communication.

The smoothening circuit 500 receives an indication 514 of actual activity from a parent smoothening circuit. The indication 514 may be any of the indications of desired activity 118, 124, 208, and 212 in FIGS. 1 and 2 and may be an analog or digital signal as described with regard to the indications 502A-502D of desired activity. The smoothening circuit 500 provides the received indication 514 of actual activity to an internal floor/ceiling circuit 516 that may impose a floor (minimum) or ceiling (maximum) value on the received indication 514 of actual activity to generate an adjusted indication 518 of actual activity. In this regard, the received indication 514 of actual activity may be adjusted to a preferred range to avoid, for example, too much or too little current draw. The floor/ceiling circuit 516 may have floor and ceiling values indicated in one of a plurality of programming registers 520 based on power distribution load balancing requirements or on minimum and maximum power consumption levels for the IC 102 of FIG. 1 or a package containing the IC 102. The smoothening circuit 500 is configured to receive, from a parent smoothening circuit, a request signal 522REQ corresponding to the indication 514 of actual activity of the tiles (or child smoothening circuits) and transmit an acknowledge signal 522ACK corresponding to the request signal 522REQ. The request signal 522REQ and the acknowledge signal 522ACK provide a handshake between the smoothening circuit 500 and the parent smoothening circuit to synchronize communication of the indication 514 of actual activity. The smoothening circuit 500 is also configured to transmit, to the child smoothening circuits, request signals 524REQA-524REQD corresponding to each of the indication 526A-526D of actual activity of the tiles and receive acknowledge signals 524ACK indicating reception of the request signals 524REQA-524REQD.

The smoothening circuit 500 further includes a control circuit 528 that generates indications 526A-526D of actual activity to the plurality of child smoothening circuits in response to the indications 502A-502D of desired activity. The indications 526A-526D of actual activity may be analog or digital signals. In one example, the control circuit 522 receives the adjusted indication 518 of actual activity from the floor/ceiling circuit 516 based on the request signal 522REQ and responds by transmitting the acknowledge signal 522ACK to the parent smoothening circuit. The control circuit 528 may determine whether di/dt control is disabled or enabled. The control circuit 528 may employ one or more algorithms implemented by logic circuits (e.g., programmable actual activity circuits) 530 to generate the indications 526A-526D of actual activity. In addition to the adjusted indication 518 of actual activity from the parent smoothening circuit, the programmable actual activity circuits 530 also receive the adjusted indications 506A-506D of desired activity and programmable values 532 from the programming registers 520. Although only two (2) programmable values 532 from the programming registers are shown, the smoothening circuit 500 may have more or fewer programming registers 520 to provide more programmable values 532 to enhance configurability. The programmable registers 520 may also indicate a total number of child smoothening circuits or a number of a plurality of tiles 202 coupled to a smoothening circuit 500, for example.

The control circuit 528 may determine whether the indication 514 of actual activity level would cause the indications 526A-526D of actual activity to be outside a programmed range. In this regard, the control circuit 528 may prevent a level of actual activity from exceeding a threshold (ceiling) or prevent a rate of change of actual activity from exceeding a threshold. The programming registers 520 may indicate limits of a rate of change of current (di/dt), such as limits on rates of current increase and current decrease. The limits on a rate of change of current in the IC 102 in FIG. 1, or an area of the IC 102, are programmed in the programming registers 520 and correspond to limits of a rate of change of activity in the tiles 202 in FIG. 2 or in a plurality of tiles 202 controlled by a plurality of smoothening circuits 500. The indications 526A-526D of actual activity may be generated based on the indications 502A-502D of desired activity, the indication 514 of actual activity, and a limit of a rate of change of current. The control circuit 528 may distribute actual activity according to an algorithm to avoid hot-spots (e.g., high current draw) and current starvation (e.g., low current draw).

The programmable values 532 may also cause the indications 526A-526D of actual activity to be staggered over time such that they are generated to the child smoothening circuits sequentially or periodically (e.g., every X cycles, where X is a programmable value) or according to another timing arrangement. The control circuit 528 may distribute actual activity equally to child smoothening circuits or apply a prioritization scheme or other distribution scheme based on known performance of a power distribution network.

The control circuit 528 may be programmed to provide the indications 526A-526D of actual activity within a limited number of clock cycles after the indications 502A-502D of desired activity such that the tiles 202 in FIG. 2 receive indications 208 of actual activity within a limited number of cycles after generating the indications 206 of desired activity. The response time for providing the indications 526A-526D after the indications 502A-502D of desired activity may depend on the number of levels of hierarchy of the activity smoothener circuit 100 in FIG. 1.

FIG. 6 is a block diagram illustrating operation of a tile 600 corresponding to the tiles 202 in FIG. 2. FIG. 6 includes a parent smoothening circuit 602, which could be the cluster smoothening circuits 110 in FIG. 1 or the smoothening circuit 200 in FIG. 2. The tile 600 is a leaf node of the hierarchy of the activity smoothener circuit 100 in FIG. 1 and is, therefore, different than other smoothening circuits in the hierarchy. Like other smoothening circuits discussed above, the tile 600 generates an indication 604 of desired activity and receives an indication 606 of actual activity from the parent smoothening circuit 602. However, because the tile 600 is at the lowest level of hierarchy, the tile 600 does not receive indications of desired activity or generate indications of actual activity.

In one example, the indication 604 of desired activity may indicate whether or not an execution circuit 608 in the tile 600 has been assigned a task. The tile 600 includes a work queue 610 configured to receive tasks to be executed and the indication 604 of desired activity can indicate whether the work queue 610 has received a task to be executed. In another example, the indication 604 of desired activity indicates the execution circuit 608 is currently executing (i.e., has not finished executing) one or more tasks. The indication 604 in FIG. 6 is a one-bit binary signal asserted or activated to indicate the work queue 610 contains a task to be executed or the execution circuit 608 is currently executing a task.

The indication 606 of actual activity may indicate a number of "credits" 612 of actual activity. The credits 612 are used to control the activity/execution rate of the execution circuit 608. In this example, the credits 612 are accumulated in a credit accumulator 614. In each cycle, a comparison circuit 615 in the tile 600 determines whether the accumulation of indications 606 of actual activity (e.g., credits 608) in the credit accumulator 614 reaches a threshold 616 that indicates whether actual work is to be performed in the execution circuit 608. The threshold 616 may be a programmed or predetermined value. In the case in which the accumulated credits 612 do not meet or exceed the threshold 616, a bubble circuit 617 may insert a "bubble" into the execution circuit 608 or temporarily gate a clock to the execution circuit 608 to insert a delay into the actual activity in the execution circuit 608. If the number of credits 612 meets or exceeds the threshold 616, a logic circuit 618 determines whether the work queue 610 has a task awaiting execution in the execution circuit 608. If there is no task waiting in the work queue 610 to be executed, a fake work generator 620 generates a task or no-op (e.g., no operation) instruction that will cause actual activity in the execution circuit 608. In other words, in response to an indication 606 of actual activity indicating activity in the execution circuit 608 when the work queue 610 does not contain a task to be executed, the execution circuit 608 executes fake work, which comprises actions that generate results that will be discarded. Other than creating the actual activity, fake tasks generated by the fake work generator 620 may have no purpose in the IC 102. Thus, the results of fake tasks are discarded. A result manager circuit 622 determines whether results of the execution circuit 608 are the results of fake work. In one example, a discard circuit 624 discards the results of fake work.

The execution circuit 608 is configured to execute a task in response to the accumulation of the indications 606 of actual activity (e.g., credits 612) meeting or exceeding the threshold 616. The results of real tasks assigned to the execution circuit 608 are provided to an appropriate destination circuit (not shown). If the accumulation of credits 612 in the credit accumulator 614 does not exceed the threshold 616, the bubble circuit 617 may introduce "pipeline bubbles" that pause the execution circuit 608 for a cycle or delays stages of a pipeline of the execution circuit 608 to limit execution to every other cycle, or less frequently.

FIG. 7 is a block diagram of an exemplary processor-based system 700 that includes a processor 702 (e.g., a microprocessor) that includes an instruction processing circuit 704. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 700 includes the processor 702. The processor 702 represents one or more general-purpose processing circuits, such as a microprocessor, central processing unit, or the like. More particularly, the processor 702 may be an EDGE instruction set microprocessor, or other processor implementing an instruction set that supports explicit consumer naming for communicating produced values resulting from execution of producer instructions.

The processor 702 is configured to execute processing logic in instructions for performing the operations and steps discussed herein. In this example, the processor 702 includes an instruction cache 706 for temporary, fast access memory storage of instructions accessible by the instruction processing circuit 704. Fetched or prefetched instructions from a memory, such as from a main memory 708 over a system bus 710, are stored in the instruction cache 706. Data may be stored in a cache memory 712 coupled to the system bus 710 for low-latency access by the processor 702. The instruction processing circuit 704 is configured to process instructions fetched into the instruction cache 706 and process the instructions for execution.

The processor 702 and the main memory 708 are coupled to the system bus 710 and can intercouple peripheral devices included in the processor-based system 700. As is well known, the processor 700 communicates with these other devices by exchanging address, control, and data information over the system bus 710. For example, the processor 702 can communicate bus transaction requests to a memory controller 714 in the main memory 708 as an example of a slave device. Although not illustrated in FIG. 7, multiple system buses 710 could be provided, wherein each system bus constitutes a different fabric. In this example, the memory controller 714 is configured to provide memory access requests to a memory array 716 in the main memory 708. The memory array 720 is comprised of an array of storage bit cells for storing data. The main memory 708 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 710. As illustrated in FIG. 7, these devices can include the main memory 708, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 710 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 to be executed by the processor 702 for any application desired according to the instructions. The instructions 730 may be stored in the main memory 708, processor 702, and/or instruction cache 706 as examples of a non-transitory computer-readable medium 732. The instructions 730 may also reside, completely or at least partially, within the main memory 708 and/or within the processor 702 during their execution. The instructions 730 may further be transmitted or received over the network 726 via the modem 722, such that the network 726 includes computer-readable medium 732.

While the computer-readable medium 736 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

Any ICs in the processor-based system 700 may include the activity smoothener circuit 100 including hierarchical smoothening circuits configured to avoid voltage variations in areas of an IC by controlling actual activity based on indications of desired activity, as illustrated in FIG. 1.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An activity smoothener circuit in an integrated circuit (IC), the activity smoothener circuit comprising:
   a plurality of circuit blocks (tiles) each comprising an execution circuit, each of the plurality of tiles configured to:
      generate a first indication of desired activity of the tile, comprising a single-bit signal indicating a request for one of inactivity and activity in the execution circuit;
      receive a first indication of actual activity for the tile, comprising a multi-bit signal representing an allowed level of activity; and
      control task execution activity in the execution circuit of the tile according to the first indication of actual activity indicated by the received first indication of actual activity for the tile; and
   a plurality of smoothening circuits, each corresponding to a cluster of the plurality of tiles, each of the plurality of smoothening circuits configured to:
      receive the first indications of desired activity from each of the plurality of tiles;
      generate a second indication of desired activity in the cluster, comprising a multi-bit signal indicating a requested level of activity in the cluster based on the first indications of desired activity in the plurality of tiles;
      receive a second indication of actual activity for the cluster as a multi-bit signal representing an allowed level of activity for the cluster; and
      generate the first indications of actual activity for each of the plurality of tiles based on the first indications of desired activity in the plurality of tiles, the second indication of actual activity in the cluster, and a first limit of a rate of change of current in each of the plurality of tiles of the IC.

2. The activity smoothener circuit of claim 1, wherein the execution circuit comprises a general-purpose processing circuit or an accelerator circuit.

3. The activity smoothener circuit of claim 1, each of the plurality of tiles further comprising a work queue configured to receive one or more tasks to be executed by the execution circuit, wherein the first indication of desired activity indicates whether the work queue received a task to be executed.

4. The activity smoothener circuit of claim 3, wherein the first indication of desired activity further indicates whether the execution circuit is currently executing a task.

5. The activity smoothener circuit of claim 1, wherein in response to the first indication of actual activity in the tile, the execution circuit executes fake work that generates results which are discarded.

6. The activity smoothener circuit of claim 1, wherein the first indications of actual activity in the plurality of tiles are accumulated and the execution circuit is configured to execute a task in response to an accumulation of the first indications of actual activity reaching a threshold.

7. The activity smoothener circuit of claim 1, wherein the smoothening circuit configured to generate the second indication of desired activity in the cluster is further configured to generate a binary sum of the first indications of actual activity from the plurality of tiles.

8. The activity smoothener circuit of claim 1, wherein the first limit of the rate of change of current in each tile of the IC is programmed in the smoothening circuit and corresponds to a limit of a rate of change of activity in the plurality of tiles.

9. The activity smoothener circuit of claim 1, wherein the smoothening circuit further comprises programmable registers configured to indicate at least one of:
   an indication of the number of the plurality of tiles;
   a floor (minimum) and a ceiling (maximum) for the first indications of actual activity for each of the plurality of tiles;
   a limit of a rate of change of current (di/dt) increase; and
   a limit of a rate of change of current decrease.

10. A method of smoothening activity in an integrated circuit (IC), the method comprising:
    in each of a plurality of circuit blocks (tiles) that each comprise an execution circuit, generating a first indication of desired activity of the tile, comprising a single-bit signal indicating a request for one of inactivity and activity in the execution circuit;
    receiving a first indication of actual activity for the tile, comprising a multi-bit signal representing an allowed level of activity;
    controlling task execution activity in the execution circuit of the tile according to the allowed level of activity indicated by the received first indication of actual activity for the tile; and
    in a plurality of smoothening circuits, each corresponding to a cluster of the plurality of tiles, and each of the plurality of smoothening circuits:
        receiving the first indications of desired activity from each of the plurality of tiles;
        generating a second indication of desired activity for the cluster, comprising a multi-bit signal indicating a requested level of activity in the cluster based on the first indications of desired activity in the plurality of tiles;
        receiving a second indication of actual activity for the cluster as a multi-bit signal representing an allowed level of activity for the cluster; and
        generating the first indications of actual activity for each of the plurality of tiles based on the first indications of desired activity in the plurality of tiles, the second indication of actual activity in the cluster, and a first limit of a rate of change of current in each of the plurality of tiles of the IC.

11. The method of claim 10, further comprising, in the tile:
    accumulating the first indications of actual activity for each of the plurality of tiles in each cycle of a clock signal; and
    executing a task in response to the accumulation of the first indications of actual activity reaching a threshold.

12. The method of claim 10, wherein generating the first indication of actual activity in the smoothening circuit is based on a programmed value indicating at least one of:
    an indication of a number of the plurality of tiles;
    a floor (minimum) and a ceiling (maximum) for the first indications of actual activity for each of the plurality of tiles;
    a limit of a rate of change of current (di/dt) increase in the plurality of tiles; and
    a limit of a rate of change of current decrease in the plurality of tiles.

13. The activity smoothener circuit of claim 1, wherein:
    the first indication of desired activity of the tile comprises an indication of power to be consumed by the tile during execution of at least one task received in a work queue.

14. The activity smoothener circuit of claim 1, wherein each of the plurality of smoothening circuits further comprises:
    a programmable register configured to indicate a maximum activity level based on a maximum power consumption level; and
    a control circuit configured to stagger the first indications of actual activity for each of the plurality of tiles over time in response to the second indication of actual activity indicating an allowed level of activity exceeding the maximum activity level.

15. The activity smoothener circuit of claim 14, wherein:
    each of the plurality of smoothening circuits is further configured to provide the first indications of actual activity for each of the plurality of tiles within a predetermined number of clock cycles following the first indications of desired activity in the plurality of tiles; and
    the predetermined number of clock cycles is programmed into the programmable register.

16. The activity smoothener circuit of claim 1, wherein each of the plurality of smoothening circuits further comprises:
    a programmable register configured to indicate a minimum activity level based on a minimum power consumption level; and
    a control circuit configured to increase the second indication of actual activity based on the minimum activity level indicated in the programmable register.

* * * * *